Inventors
William C. Anthony
Richard R. Howard
by Parker + Carter
Attorneys.

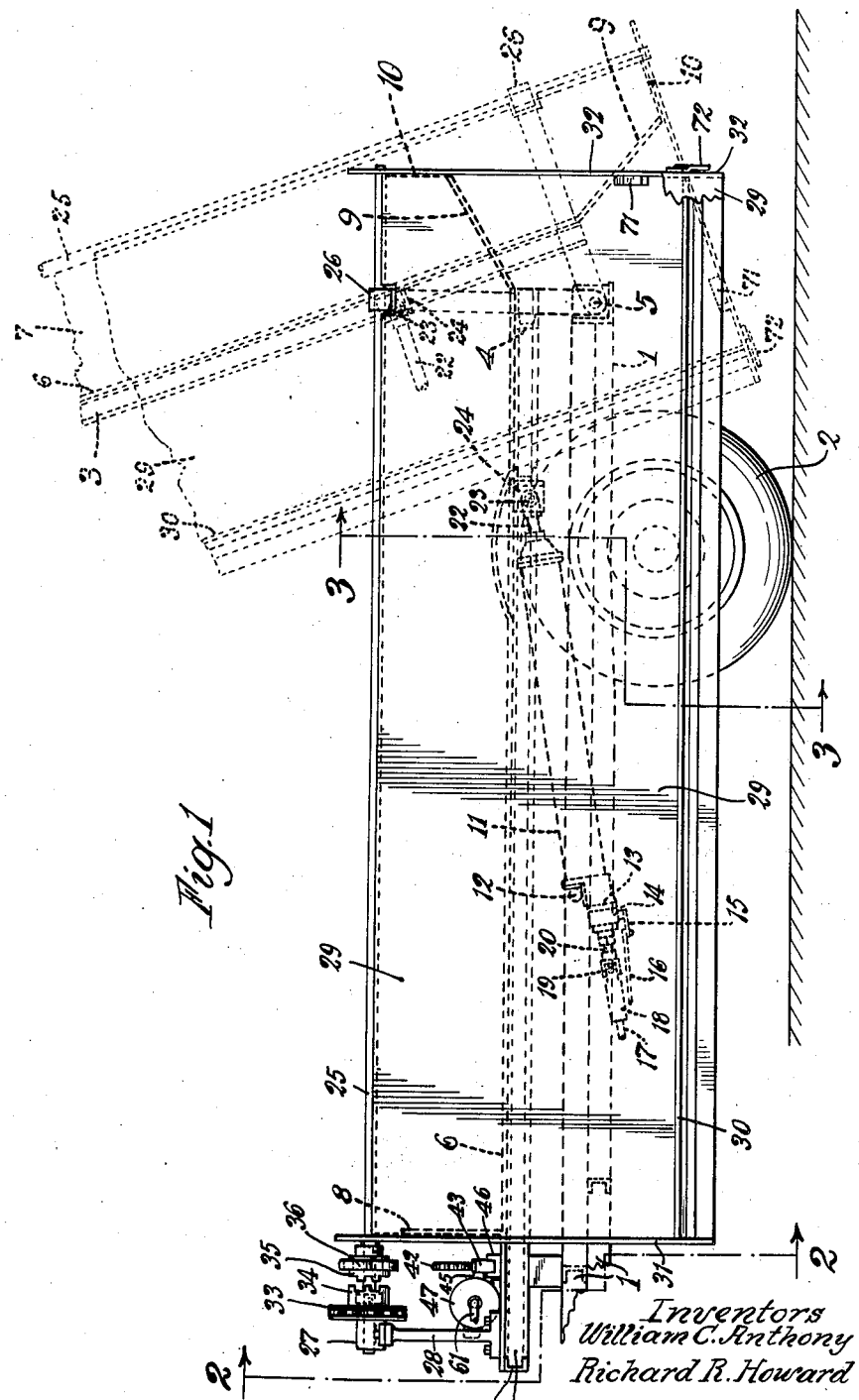

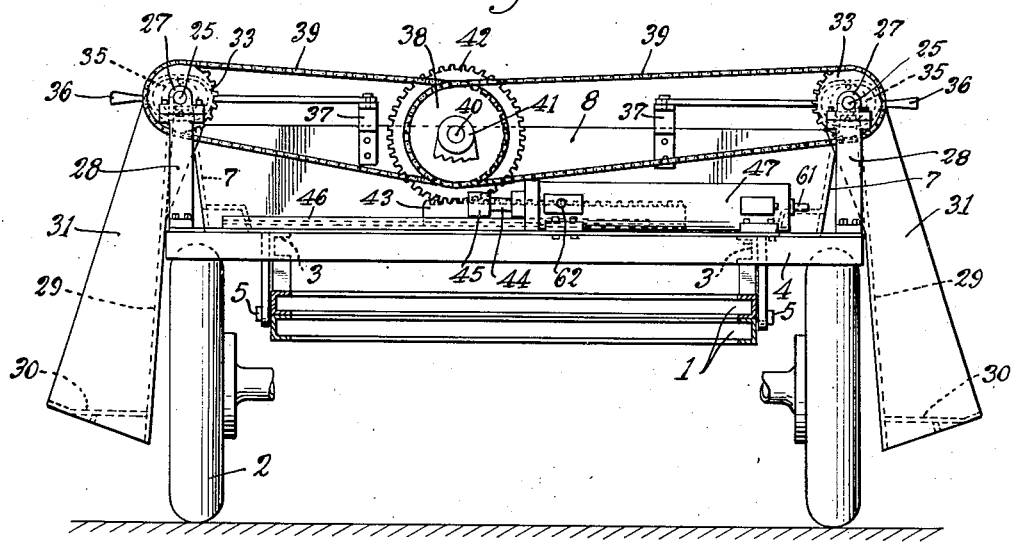
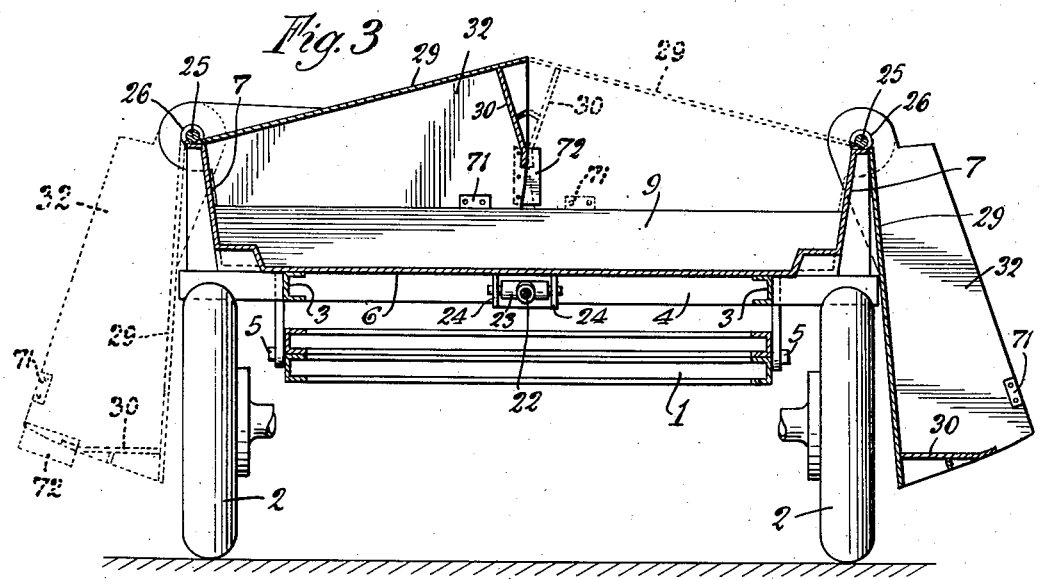

Patented Dec. 19, 1939

2,183,813

UNITED STATES PATENT OFFICE 2,183,813

RAISING AND TIPPING VEHICLE

Richard R. Howard and William C. Anthony, Streator, Ill., assignors to Anthony Company, Inc., Streator, Ill., a corporation of Illinois Application November 30, 1938, Serial No. 243,072

13 Claims. (Cl. 214—67)

This invention relates to a dumping or tipping receptacle and to a cover therefor. It has for one object to provide a movable cover for a tipping receptacle. It has for another object to provide a movable receptacle cover. Another object is to provide in connection with a receptacle means associated with it and having the dual function of assisting in loading the receptacle and in covering it. Another object is to provide means for operating the cover means. Another object is to provide a hydraulic drive mechanism and selective control means for the hydraulic drive mechanism for operating the tipping mechanism and for operating the means which control the cover.

Other objects will appear from time to time throughout the specification and the claims.

The invention is illustrated more or less diagrammatically in the accompanying drawings, wherein:

Figure 1 is a side elevation of the receptacle in position on a truck;

Figure 2 is a transverse vertical section with parts in elevation taken at line 2—2 of Figure 1 and illustrating the forward or drive end of the receptacle assembly;

Figure 3 is a transverse vertical section taken at line 3—3 of Figure 1 and looking toward the rear;

Like parts are designated by like characters throughout the specification and the drawings.

Figure 4:
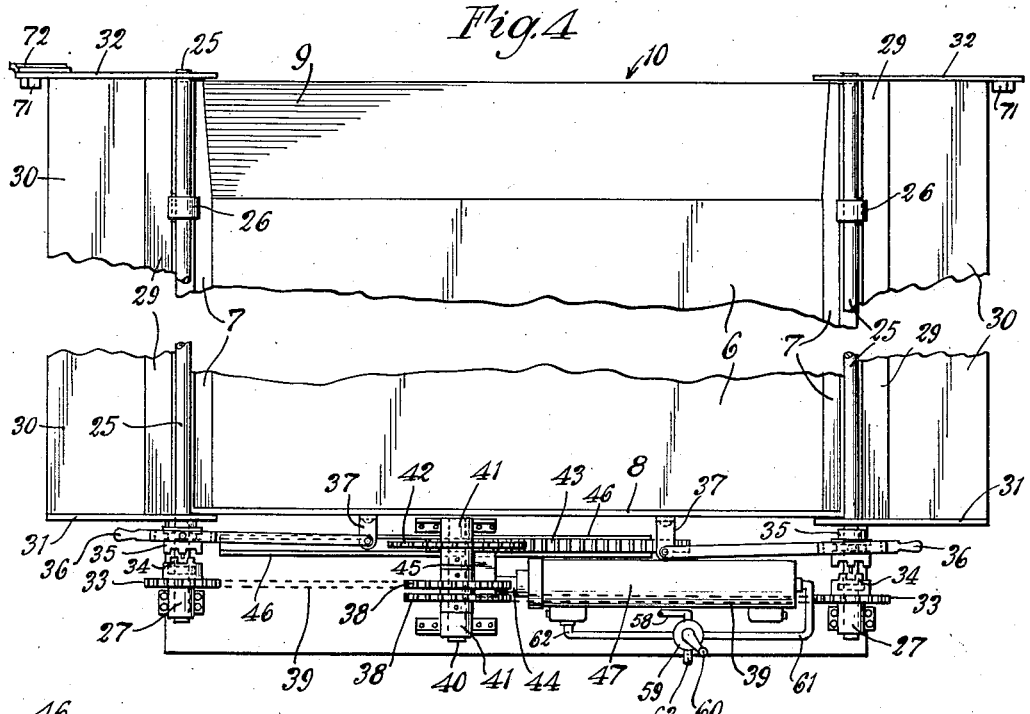
Figure 4 is a plan view with parts broken away and parts omitted.

In the particular form here shown the body is mounted upon an automobile truck. It might be mounted upon a stationary support or upon any other movable support. As shown, the truck comprises a frame 1, wheels 2, supported by any suitable spring and spring means, not shown. The body or receptacle which is arranged to tip comprises a frame 3, having suitable cross members 4. The frame 3 is pivoted to the vehicle frame 1 as at 5. The dumping body assembly may be pivoted directly to the chassis form of the vehicle or to a sub-frame mounted thereon. The particular details of the chassis and sub-frame and the tipping means form no essential part of the present invention, and they are shown and described only sufficiently to enable the operation of the device to be understood.

Mounted on the frame 3 is a body or receptacle 6, which has side walls 7 and a forward wall 8. At its rear end the body is provided with an upwardly sloped floor portion 9, which is open as at 10.

11 is a hydraulic cylinder, which in the particular form here shown is pivoted to the chassis or sub-frame as at 12. A pump 13 is preferably associated with the cylinder and mounted to one cylinder head for unitary movement with the cylinder assembly. A main control valve 14 is associated with the pump and, as shown, is contained in a housing attached to the pump housing. An operating lever 15 extends outward from the valve and is connected by means of a reaching rod 16 to any suitable location where the operation of the device is to be controlled; for example, the cab or driver's seat of the truck. The pump is operated preferably from the engine of the vehicle by means of a shaft 17, which is connected through a telescopic joint 18 and a universal joint 19 to the pump shaft 20.

A piston 21 is mounted within the cylinder 11 and has connected to it a piston rod 22, which projects outwardly from the cylinder and carries at its end a cross head 23, which is pivoted to the body or tipping frame upon bearings 24. As shown, the piston and cylinder are arranged for single action. The body is tipped by the action of the piston and is returned to its untipped position by gravity. A double acting assembly might be used so that the body is both raised and lowered by power. Either arrangement may be used as desired.

Upon the upper edge of each of the walls 7 is mounted a shaft 25. At its rear end the shaft is supported in bearings 26, which rest upon and are secured to the upper edge of the walls 7. At their forward ends, the shafts are carried in bearings 27, which are secured to upstanding supports 28, which are themselves secured to the tipping frame members 4. Extending along the shafts 25 and preferably extending from end to end of the receptacle itself are mounted sheet-like members 29, which, as shown in Figure 3 in particular, may extend downward or may be raised to cover the top of the body. Attached to or formed integrally as parts of the members 29 are angularly disposed flanges or shelves 30; one of these is provided for each of the members 29 and they are preferably co-extensive with those members. As shown, they are separate pieces welded to the sheets but they might be formed by turning up the bottom edge of each sheet. At the forward end of each sheet 29, a bracing web 31 is secured, and this web is shaped as shown in Figure 2 particularly. At the rear end of each sheet 29, a web 32 is secured. These rear webs differ somewhat in shape from the webs 31 because they close the rear end of the body when in the position shown in Figure 3.

Each sheet 29, its shelf 30 and its end web members 31 and 32 form a rigid structure which may be used as a unit, and form a step or shelf along the side of the body when in the open position, and form a cover for the top and a closure for the end of the body when in a raised or closed position of Figure 3. Loosely mounted on each of the shafts 25 is a sprocket wheel 33 whose hub is provided with teeth 34 to engage the correspondingly shaped clutch member 35, which is itself splined upon the shaft 25. Levers 36 pivoted at 37 provide manual means for moving the grooves into and out of engagement.

Two driving sprockets 38, 38 are provided; one for each of the sprockets 33; and a chain 39 is in position about each pair of sprockets. The driving sprockets 38 are carried upon a shaft 40, which is supported in bearings 41 upon the tipping receptacle. A driving pinion 42 is secured upon the shaft 40 and meshes with a rack 43, which is attached to the outer end of the piston rod 44 by a member 45.

The rack is arranged to slide in between guides 46, 46.

The piston rod 44, which operates the rack, is mounted in a cylinder 47, which is secured to the forward end of the dumping body. It and the driving means just above described might be mounted anywhere on the body or in any position. As a matter of convenience they will ordinarily be mounted toward the forward end of the body and will ordinarily be provided with a cover which has been omitted in the showing of the present drawings.

The cylinder 47 and its piston 48 are arranged for double action so that the piston may be forcibly moved both to the right and to the left in order to operate the rack and the mechanism which it drives positively to the opening and to the closing movement of the movable side members. The cylinder 47 is provided adjacent one end with a by-pass connection 49, which is controlled by a ball check 50 and a spring 51. A corresponding by-pass 52 is provided adjacent the opposite end and contains also a ball check 53 and a spring 54.

Figure 5:
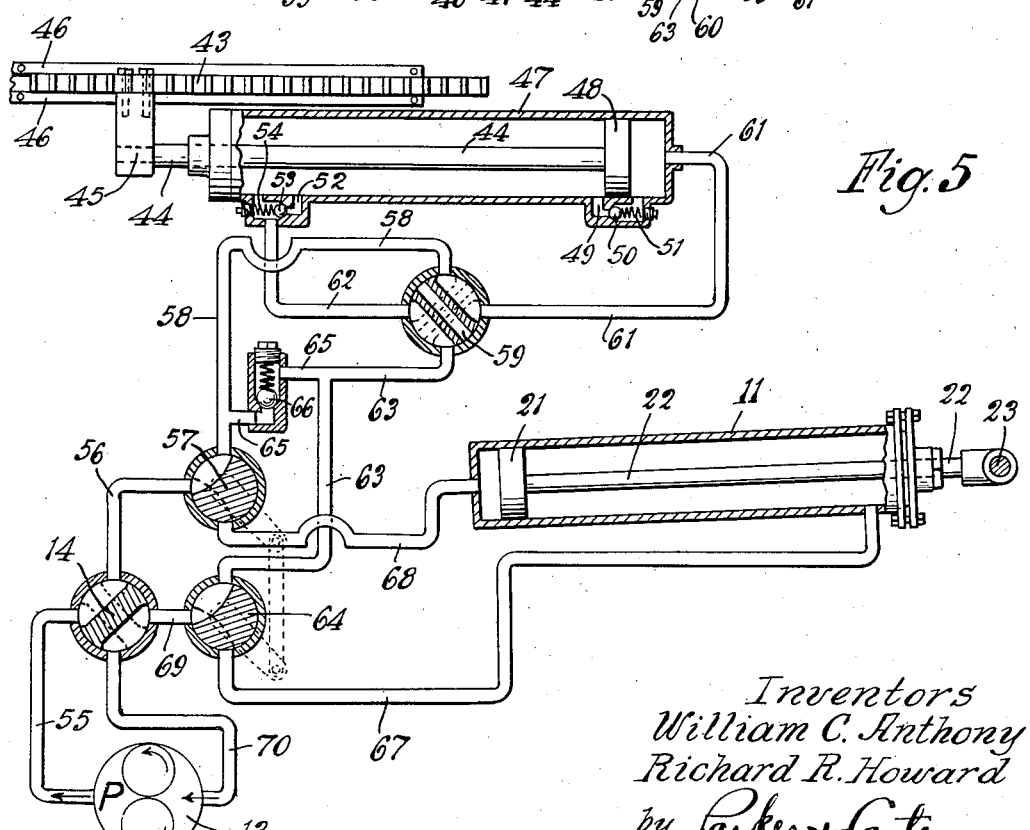
Figure 5 is a schematic diagram of the hydraulic means and connections.

The hydraulic linkage of the total assembly is operated by the single pump 13, and means are provided in the valves 57 and 64 to direct fluid either to the body tipping cylinder 11 or to the cover-operating cylinder 47, as desired. As shown, a conduit 55 carries fluid from the pump to the main valve 14. From that valve housing a conduit 56 carries fluid to the valve 57 and from it a conduit 58 carries fluid to the cover-controlling valve 59. A handle 60 extends outward from this housing and furnishes manual means for moving the valve. A conduit 61 leads from the valve 59 to one end of the cylinder 47, to the right-hand end, as shown in Figure 5; and a conduit 62 leads also from the valve 59 to the other end of the cylinder 47. A further conduit 63 extends from the valve 59 to a valve 64. A branch conduit 65 connects the conduit 63 with the conduit 58 and has positioned in it a ball check valve 66. From the valve 64 a conduit 67 leads to one end of the cylinder 11, the right-hand end as shown in Figure 5. From the opposite end of the cylinder 11 a conduit 68 leads to the valve 57. The valve 64 is further connected through a conduit 69 to the valve 14. Another conduit 70 leads from the valve 14 to the pump 13.

When the cover mechanism here shown is applied to a body, it is preferable to arrange the members 32 at the rear of the vehicle so that they not merely stiffen and support the cover structure but so that they also serve to close the end of the body. Where the end is partially open and without any tail gate, the members 32 of the cover structure thus serve as gates. To accomplish this and to steady them in position, stops 71 may be applied; and these contact the upper edge of the body portion 9 and support, in part at least, the cover structure. The opposed edges of the members 32 may be rounded, as shown particularly in Figure 3, so that they pass each other in the opening and closing movements. When they are thus rounded, it is convenient to apply a member 72 to one of the gates to cover up or to close the gap which would be left as shown particularly in Figure 3.

Although there is shown an operative form of the device, it will be understood that many changes in the form, shape and arrangement of parts might be made without departing from the spirit of the invention, and it is desired that this showing be taken as in a sense diagrammatic.

The use and operation of this device are as follows:

The cover structure may be applied to any container which it is necessary to cover and is not limited in its use to application to a dumping body. Where, however, it is applied, as in the present case, to a dumping body, it is desirable to have the power source for the dumping mechanism serve as the power source for moving the cover structure. As here shown, the pump 13 furnishes the source of power for both mechanisms and is itself preferably driven from the truck engine by means of a power take-off and suitable shaft connections. The main valve 14 may be manipulated from the driver's seat by the member 16. When in the full line position of Figure 5 it directs the pressure fluid to one or the other of the cylinders 11 or 47. When in the dotted line position, it merely permits the fluid to circulate from the pump and back to the pump. Although no sump or other storage receptacle is shown, one may form a part of the assembly; and it is omitted to simplify the showing in this case.

The particular body shown herewith, while it may have many uses, is especially adapted to carrying garbage. It will be loaded in the horizontal or full line position of Figure 1; and for loading, one or both of the cover parts will be opened. The hydraulic mechanism, as shown in Figure 5, is set to operate the cover mechanism. Pressure fluid passes from the pump through conduit 55, valve 14, conduit 56, valve 57, conduit 58, valve 59, conduit 61, into the cylinder 47. With this valve setting, if fluid is supplied, the piston 48 will be moved to the left. It will move the rack 43 with it, and this will rotate the pinion 42 and the sprocket-drive wheels 38. As they move, each of the chains 39 is moved and each rotates the sprocket 33 with which it meshes. With the parts, as shown in Figure 4, rotation of the sprockets 33 has no effect on the cover structure. If it is desired to close one of the covers, the appropriate clutch handle 36 is moved to engage the clutch, and rotation of the sprocket 33 will then move the particular cover section. Movement of the rack from the position of Figures 2, 4 and 5 will, if the clutches are engaged, rotate the cover sections to the closed position.

Movement in the opposite direction will open them. Ordinarily, only one will be opened at a time because ordinarily the body is filled from only one side at a time.

Movement of the cover sections in the opposite direction is accomplished by changing the position of the valve 59 from that shown in full lines in Figure 5 to that shown in dotted lines. Then the piston would be drawn in again to the position of Figure 5, carrying the rack back from the extended to the withdrawn position. Valve 59 is shown in Figure 4 as having a handle 60. This handle might be operated manually or might be connected to some other means for operating it so that it could be operated from a distance.

When it is desired to dump the body, the valves 57 and 64 are moved from the full line position of Figure 5 to the dotted line position of that figure by any desired valve-moving mechanism, one form of which is suggested in dotted lines. With these valves in the dotted line position, fluid under pressure moves from the pump through the conduit 55, the valve 14, the conduit 56, the valve 57, the conduit 63, to the cylinder 11, and then moves the cylinder to the right, tipping the body. The cylinder 11 is not shown as provided with an over-run safety mechanism to prevent the piston from going too far to the right, but that, of course, could be applied if desired. When the piston has reached its limit, the body is in the dotted line position of Figure 1, and will be dumped. While a double-acting cylinder and piston assembly might be provided for raising and lowering the body, for most purposes a single-acting assembly will suffice; and the one shown is single-acting and permits the body to turn by gravity. That is accomplished by any desired means for permitting fluid under pressure to escape from the cylinder 11. Ordinarily, the covers will be open at the time of dumping. They are so shown in dotted lines in Figure 1.

The shelf member 30 of the covers may be used in many ways. An operator in loading the body may stand on it. He may put material on it; and, then, by operating the cover, throw or carry the material into the body. For some purposes, it is desirable to extend the outer edges of the members 30 upward so that they form with the other associated parts a trough. Garbage or other material can be put into this trough; and when the cover member is raised, it will deposit the material in the body. Hooks or other retaining means can be provided on the plates 29 or elsewhere on the cover sections; and garbage cans, boxes or other smaller receptacles may be placed on the cover section and held in place while the section is moved to the raised position and the contents of the can or box is dumped into the body. The cover devices thus form means for use in loading and means for covering the body as desired.

We claim:

1. In combination in a tipping assembly, a body receptacle mounted for tipping, a pressure source, means actuated by pressure from said source for tipping said body, a cover element movably positioned upon said body, and means actuated by the pressure from said pressure source for positively and directly moving said cover element.

2. In combination in a tipping assembly, a body receptacle mounted for tipping, a fluid pump, means actuated by fluid from said pump for tipping said body, a plurality of cover elements movably positioned upon said body, and means actuated by fluid from said pump for opening and closing said cover elements.

3. In combination in a tipping assembly, a body receptacle mounted for tipping, a source of fluid pressure, means actuated by said fluid pressure from said source for tipping said body, a plurality of cover elements movably positioned upon said body, and selective means actuated by fluid pressure from the same power source for positively moving said cover elements separately or together.

4. In combination, a receptacle supported for tipping movement, and means for tipping said receptacle, cover members mounted upon said receptacle for movement with respect thereto, said cover members adapted to be moved to cover the receptacle and to be moved to a position uncovering the receptacle, and direct means for raising and lowering said cover members and selective controls for each of said cover raising and lowering means whereby they are held out of operation or moved at will, and a source of power adapted to operate said cover-operating means and to dump said receptacle and control devices therefor.

5. In combination, a receptacle supported for tipping movement, and means for tipping said receptacle, cover members mounted upon said receptacle for movement with respect thereto, said cover members adapted to be moved to cover the receptacle and to be moved to a position uncovering the receptacle, and positive means for moving said cover members and selective controls for each of said cover means whereby they are held out of operation or moved, said cover means having top closing parts and tail gate parts for said receptacle, and a source of power adapted to operate said cover-operating means and control devices therefor.

6. In combination, a receptacle supported for tipping movement, and means for tipping said receptacle, cover members mounted upon said receptacle for movement with respect thereto, said cover members adapted to be moved to cover the receptacle and to be moved to a position uncovering the receptacle, and means for positively moving said cover members and selective controls for each of said cover moving means whereby they are held out of operation or moved at will, and a single source of power adapted selectively to operate said tipping means and said cover-operating means and control devices therefor.

7. In combination, a receptacle supported for tipping movement, and hydraulic means for tipping said receptacle, cover members mounted upon said receptacle for movement with respect thereto, said cover members adapted to be moved to cover the receptacle and to be moved to a position uncovering the receptacle, and cover operating means, for moving said cover members and selective controls for each of said cover operating means whereby they are held out of operation or moved at will, and a single source of hydraulic power adapted to operate said tipping means and said cover-operating means and selective control devices therefor.

8. In combination, a receptacle having an open top and end, a cover member secured to said receptacle and adapted to move to close the top and its end of the receptacle and to move to an open position in which it depends downwardly, said cover member formed of an end part, a shelf part and sheet-like piece joining the end part and the shelf part, the latter, forming, when the cover is open, an extended supporting surface adapted to receive material and receptacles to be loaded into the vehicle.

9. In combination, a receptacle having an open top and end, a plurality of cover members secured to said receptacle and adapted to be moved to close it and to be moved to an open position in which they depend downwardly, said cover members formed of end parts, a shelf part and sheet-like pieces joining the end parts and the shelf part, the latter forming, when the covers are open, an extended supporting surface adapted to receive material and receptacles to be loaded into the vehicle.

10. In combination with a receptacle having an open top, a member mounted on said top and adapted in one position to over-lie said receptacle; and in another position to depend downwardly alongside of said receptacle, a portion of said cover comprising in the down position a material-receiving support, and means for discharging said material into the receptacle, said means comprising a mechanism for raising said cover and for moving it above said receptacle, said mechanism including a hydraulic cylinder, a rack and pinion, and means for connecting said pinion to said cover member whereby movement of said rack and pinion moves said cover member.

11. In combination with a receptacle having an open top, a member mounted on said top and adapted in one position to over-lie said receptacle; and in another position to depend downwardly alongside of said receptacle, a portion of said cover comprising in the down position a material-receiving support, and means for discharging said material into the receptacle, said means comprising a mechanism for raising said cover and for moving it above said receptacle, said raising mechanism comprising a hydraulic cylinder and piston, a rack and pinion, a connection between the piston and the rack, a sprocket-driving wheel associated with said pinion to move with it, a shaft on said body, said cover secured to said shaft, a sprocket fixed to said shaft, a chain connecting said last mentioned sprocket to said driving sprocket; a clutch for engaging and disengaging said last mentioned sprocket with said shaft.

12. In combination, a receptacle having an open top and end, a cover member securing to said receptacle and adapted to move to close it and to move to an open position in which it depends downwardly, said cover member formed of end parts, sheet-like piece joining the end parts and shelf member, forming, when the cover is open, an extended supporting surface adapted to be used as a step and extending approximately the full length of the body, one of said end parts closing the open end of said receptacle, said end parts overlapping said open end when said cover member is in closed position.

13. In combination, a receptacle having an open top and end, a plurality of cover members secured to said receptacle and adapted to move to close it and to move to an open position in which they depend downwardly, said cover members formed of end parts and longitudinal parts, said longitudinal parts including an extended shelf member lying, when the covers are open, in a substantially horizontal position, said end parts closing said open end of said receptacle when said given members are in closed position.

RICHARD R. HOWARD.
WILLIAM C. ANTHONY.